(12) United States Patent
Reuter et al.

(10) Patent No.: US 11,760,330 B2
(45) Date of Patent: Sep. 19, 2023

(54) ELECTRO-HYDRAULIC BRAKE SYSTEM INCLUDING ISOLATION VALVES

(71) Applicant: BWI (Shanghai) Co., Ltd., Shanghai (CN)

(72) Inventors: David Fredrick Reuter, Beavercreek, OH (US); Pascal Chaumette, Creteil (FR)

(73) Assignee: BWI (SHANGHAI) CO., LTD., Shanghai (CN)

( * ) Notice: Subject to any disclaimer, the term of this patent is extended or adjusted under 35 U.S.C. 154(b) by 619 days.

(21) Appl. No.: 16/859,716

(22) Filed: Apr. 27, 2020

(65) Prior Publication Data

US 2020/0339092 A1    Oct. 29, 2020

Related U.S. Application Data

(60) Provisional application No. 62/839,596, filed on Apr. 26, 2019.

(30) Foreign Application Priority Data

Apr. 2, 2020  (CN) .......................... 202010254849.7

(51) Int. Cl.
    *B60T 13/74*    (2006.01)
    *B60T 8/36*     (2006.01)
    *B60T 15/04*    (2006.01)

(52) U.S. Cl.
    CPC .............. *B60T 13/745* (2013.01); *B60T 8/36* (2013.01); *B60T 15/045* (2013.01)

(58) Field of Classification Search
    CPC ................................. B60T 15/045; B60T 8/36
    (Continued)

(56) References Cited

U.S. PATENT DOCUMENTS

| 4,828,335 A | 5/1989 | Fuller et al. |
| 4,883,328 A | 11/1989 | Burgdorf et al. |

(Continued)

FOREIGN PATENT DOCUMENTS

| CN | 1833930 A | 9/2006 |
| CN | 103492247 A | 1/2014 |

(Continued)

OTHER PUBLICATIONS

First Office Action and Search rRport dated Jan. 12, 2021 for counterpart Chinese patent application No. 202010254849.7, along with machine EN translation downloaded from EPO.

*Primary Examiner* — Melanie Torres Williams
(74) *Attorney, Agent, or Firm* — William H. Honaker; Dickinson Wright PLLC (57) ABSTRACT

An electro-hydraulic brake system comprises a master cylinder block in fluid communication with a reservoir tank containing a brake fluid. The master cylinder block defines a bore and primary and secondary openings. A protrusion extends outwardly from a rear surface of the master cylinder block. A pressure supply unit coupled to a front surface of the master cylinder block and in fluid communication with the reservoir tank for supplying the brake fluid from the reservoir tank. A master cylinder electronic control unit couples to the rear surface and in an abutment relationship with the protrusion. At least one isolation valve disposed on the rear surface, spaced apart from the protrusion and received by the master cylinder electronic control unit, for regulating brake fluid flow from the master cylinder block to the wheel brakes.

16 Claims, 8 Drawing Sheets

(58) Field of Classification Search
USPC .................................................. 303/DIG. 10
See application file for complete search history.

(56) References Cited

U.S. PATENT DOCUMENTS

| | | | |
|---|---|---|---|
| 5,401,084 A | 3/1995 | Volz | |
| 5,788,337 A | 8/1998 | Eckert | |
| 6,206,484 B1 | 3/2001 | Ganzel | |
| 6,899,403 B2 | 5/2005 | Isono et al. | |
| 7,963,619 B2 * | 6/2011 | Hinz | B62L 3/08 |
| | | | 303/DIG. 10 |
| 8,020,946 B2 * | 9/2011 | Iyatani | B60T 8/368 |
| | | | 303/119.2 |
| 8,746,810 B2 * | 6/2014 | Atsushi | B60T 8/368 |
| | | | 303/DIG. 10 |
| 9,205,821 B2 | 12/2015 | Biller et al. | |
| 2005/0057093 A1 * | 3/2005 | Segawa | B60T 8/368 |
| | | | 303/DIG. 10 |
| 2012/0043880 A1 | 2/2012 | Linkenbach et al. | |
| 2015/0020520 A1 | 1/2015 | Feigel et al. | |

FOREIGN PATENT DOCUMENTS

| | | | |
|---|---|---|---|
| CN | 105492270 A | 4/2016 | |
| CN | 107074216 A | 8/2017 | |
| CN | 108501909 A | 9/2018 | |
| CN | 108501910 A | 9/2018 | |
| CN | 103459214 A | 1/2019 | |
| CN | 109204261 A | 1/2019 | |
| CN | 109229087 A | 1/2019 | |
| CN | 109572644 A | 4/2019 | |
| DE | 102012205860 A1 | 10/2012 | |
| DE | 102012210809 A1 | 1/2013 | |
| DE | 102015224621 A1 | 6/2016 | |
| DE | 102017208178 A1 | 11/2018 | |
| WO | 2005058664 A2 | 6/2005 | |
| WO | WO-2016125813 A1 * | 8/2016 | ............. B60T 13/68 |

* cited by examiner

ELECTRO-HYDRAULIC BRAKE SYSTEM INCLUDING ISOLATION VALVES

CROSS-REFERENCE TO RELATED APPLICATIONS

This application claims the benefit of U.S. Provisional Application Patent Ser. No. 62/839,596, filed Apr. 26, 2019, and CN202010254849.7, filed Apr. 2, 2020. The entire disclosures of which are hereby incorporated herein by reference.

BACKGROUND OF THE INVENTION

1. Field of the Invention

The present invention generally relates to an electro-hydraulic brake system for a vehicle and a method of controlling isolation valves of the electro-hydraulic brake system.

2. Description of the Prior Art

As electric and hybrid vehicles continue to proliferate in markets around the world, it is well understood that significant lengthening of battery life can be obtained by utilizing the motor-generator output capabilities of that device during braking. However, the input torque in the generator mode used to recharge batteries is not consistent with driver input function of pedal force/travel verses vehicle deceleration. In order to achieve that complex function, the hydraulic brakes of the vehicle must supply the difference between generator braking torque and driver requested braking torque.

The engineering world has understood this requirement for a number of years commonly known as regenerative brake blending. A most efficient way to achieve this is to use a "brake-by-wire" technique. To accomplish this, the brake pedal in effect becomes a joy stick, so it must be connected to a travel and/or force sensor in order to send a signal to the system ECU that will interpret this as driver's intent of a desired vehicle deceleration. In addition, the brake pedal "feel" must be simulated by the appropriate force-travel relationship and must also have the ability to be isolated from directly applying the master cylinder to the wheel brakes.

As first noted regarding the proliferation of hybrid and electric vehicles in the world, there is another phenomenon taking place as well, being the push for autonomous, self-driving vehicles. As a result, the Society of Automotive Engineers (SAE) has developed guidelines for the path to autonomy range from level 0 to level 5. Level 0 is no automation. Level 1 is driver assistance required, e.g. adaptive cruise control. Level 2 is partial automation, e.g. Cadillac Super Cruise—driver keep hand on steering wheel. Level 3 is conditional automation, e.g. Audi Traffic Jam Pilot. Level 4 is high automation, e.g. self-driving vehicle with some very specific speed restrictions. Level 5 is full automation where the vehicle can operate at the same level as a human driver.

Brake-by-wire systems having a master cylinder block and a manifold block are well known. With this type of architecture, individual wheel pressure control is typically handled by the manifold block (also known as the stability control unit). This feature provides functions such as, but not limited to, ABS, traction control, and stability control. In addition, another important function is dynamic rear braking. It is well known in the braking industry that when a vehicle decelerates there is a forward shift in the center of gravity. This necessitates more front brake torque and less rear brake torque to prevent rear wheel lock-up. As the rear wheels are needed to provide vehicle stability, the lock-up of the rear wheels are not permitted under all braking conditions.

In the event that the stability control unit fails, in some systems, the master cylinder block of the brake-by-wire system is only capable of providing equal pressure to both the front wheels and the rear wheels since dynamic rear braking comes exclusively from the manifold block. This feature can easily allow rear wheels to lock-up thereby make the vehicle unstable. Accordingly, this precludes the vehicle from reaching basic requirements dictated by the customer and especially higher levels such as level four or level five of the autonomy scale.

One such an electro-hydraulic brake system is disclosed in U.S. Pat. No. 9,205,821. The electro-hydraulic brake system is for use in a vehicle having a plurality of wheel brakes. The electro-hydraulic brake system comprises a master cylinder block disposed in fluid communication with a reservoir tank containing a brake fluid. The master cylinder block defines a bore extending along a side surface of the master cylinder block for receiving at least one brake piston and a pair of openings. The openings include a primary opening and a secondary opening, spaced apart from one another, in fluid communication with the bore. A pressure supply unit couples to the master cylinder block and in fluid communication with the reservoir tank for supplying the brake fluid from the reservoir tank. A master cylinder electronic control unit couples the master cylinder block.

SUMMARY OF THE INVENTION

The present invention provides an electro-hydraulic brake system that is capable of maintaining dynamic rear proportioning in the event of a manifold block failure. The present invention also provides an electro-hydraulic brake system having a more compact design and reduced energy consumption. In particular, the present invention provides an electro-hydraulic brake system having a fallback ABS function which can be implemented to satisfy the requirements of the higher levels of the SAE's path to autonomy range. Furthermore, the present invention provides an electro-hydraulic brake system that is capable of conducting some self-pressure testing.

It is one aspect of the present invention to provide an electro-hydraulic brake system for a vehicle having a plurality of wheel brakes. The electro-hydraulic brake system comprises a master cylinder block disposed in fluid communication with a reservoir tank containing a brake fluid. The master cylinder block defines a bore extending along a side surface of the master cylinder block for receiving at least one brake piston and a pair of openings. The openings include a primary opening and a secondary opening, spaced apart from one another, in fluid communication with the bore. A protrusion extends outwardly from a rear surface of the master cylinder block to a terminal end. A pressure supply unit couples to a front surface of the master cylinder block and in fluid communication with the reservoir tank for supplying the brake fluid from the reservoir tank. A master cylinder electronic control unit couples to the rear surface of the master cylinder block and in an abutment relationship with the protrusion. At least one isolation valve is disposed on the rear surface, spaced apart from the protrusion and received by the master cylinder electronic control unit, for regulating brake fluid flow from the master cylinder block to the wheel brakes.

It is another aspect of the present invention to provide an electro-hydraulic brake system for a vehicle having a plurality of wheel brakes. The electro-hydraulic brake system comprises a master cylinder block disposed in fluid communication with a reservoir tank containing a brake fluid. A manifold block is disposed in fluid communication with the master cylinder block for supplying the brake fluid from the master cylinder block to the wheel brakes. The master cylinder block defines a bore and a pair of openings. The bore extends along a side surface of the master cylinder block for receiving at least one brake piston. The openings include a primary opening and a secondary opening, spaced apart from one another, in fluid communication with the bore. A protrusion extends outwardly from a rear surface of the master cylinder block to a terminal end. A pressure supply unit couples to a front surface of the master cylinder block and in fluid communication with the reservoir tank for supplying the brake fluid from the reservoir tank. A master cylinder electronic control unit couples to the rear surface of the master cylinder block and in an abutment relationship with the protrusion. At least one isolation valve disposed on the rear surface, spaced apart from the protrusion and received by the master cylinder electronic control unit, for regulating brake fluid flow from the master cylinder block to the wheel brakes.

It is another aspect of the present invention to provide a method of preventing wheel slip for a vehicle having a plurality of wheel brakes using an electro-hydraulic brake system. Each of the wheel brakes has a wheel speed sensor. The electro-hydraulic brake system includes a master cylinder block defining a bore and a pair of openings including a primary opening and a secondary opening in fluid communication with the bore. A manifold block is in fluid communication with the master cylinder block. A pressure supply unit couples to the master cylinder block. A pair of isolation valves include a first isolation valve and a second isolation valve. The first isolation valve is located between the bore and the primary opening. The second isolation valve is located between the bore and the secondary opening. A master cylinder electronic control unit connects to the wheel speed sensors. The method comprises the steps of detecting a failure in the manifold block. Next, the method proceeds with a step of determining percent slip for the wheels based on feedback received from the wheel speed sensors. Then, the method follows with a step of reducing the percent slip by selectively opening and closing the isolation valves or reducing brake fluid pressure supplied by the pressure supply unit.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
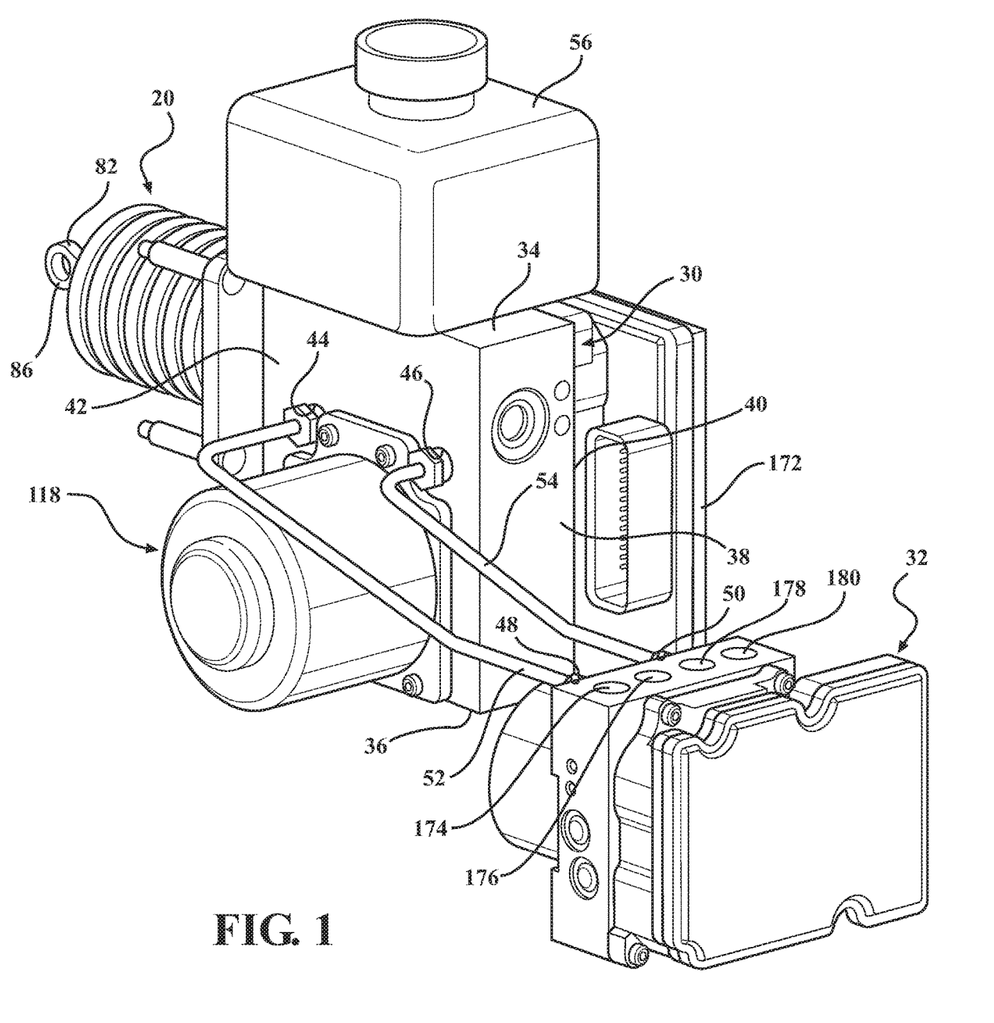
FIG. 1 is a perspective view of an electro-hydraulic brake system constructed in accordance with one embodiment of the present invention.

Referring to the Figures, wherein like numerals indicate corresponding parts throughout the several views, an electro-hydraulic brake system 20 constructed in accordance with one embodiment of the present invention is generally shown in FIG. 1. Typically, the electro-hydraulic brake system 20 can be implemented in an automobile vehicle having four wheel brakes 22, 24, 26, 28 including a pair of front wheel brakes 22, 24 and a pair of rear wheel brakes 26, 28.

Referring to FIG. 1, the electro-hydraulic brake system 20 is a two-box system including a master cylinder block 30 in fluid communication with a manifold block 32. The master cylinder block 30, having a generally rectangular shape, includes a plurality of surfaces having a top surface 34, a bottom surface 36, a pair of side surfaces 38, a front surface 40 and a rear surface 42. The top and the bottom surfaces 34, 36 are opposite and spaced from one another. The side surfaces 38, opposite and spaced from one another, connect the top surface 34 and the bottom surface 36 to one another establishing the rectangular shape. The front and rear surfaces 40, 42 connect to the top, the bottom, and the side surfaces 38 forming the master cylinder block 30. The front surface 40 of the master cylinder block 30 defines a primary opening 44 and a secondary opening 46 for fluid connection with the manifold block 32.

The manifold block 32, also having a generally rectangular shape and spaced from the master cylinder block 30, is in fluid communication with the wheel brakes 22, 24, 26, 28 through outlets 174, 176, 178, 180, respectively, for supplying brake fluid from the master cylinder block 30 to the wheel brakes 22, 24, 26, 28 of the vehicle. The manifold block 32 defines a primary inlet 48 and a secondary inlet 50, each having a generally circular shape, for fluid connection with the master cylinder block 30. At least one fluid connection line 52, 54 extends between the master cylinder block 30 and the manifold block 32 connecting the master cylinder block 30 with said manifold block 32 to establish a fluid connection from the master cylinder block 30 to the wheel brakes 22, 24, 26, 28 of the vehicle. The at least one fluid connection line 52, 54 includes a primary fluid connection line 52 and a secondary fluid connection line 54. The primary fluid connection line 52 extending between the primary inlet 48 of the manifold block 32 and the primary opening 44 of the master cylinder block 30. The secondary fluid connection line 54 extends between the secondary inlet 50 of the manifold block 32 and the secondary opening 46 of the master cylinder block 30. In other words, the primary inlet 48 is in fluid communication with the primary opening 44 and the secondary inlet 50 is in fluid communication with the secondary opening 46.

Figure 2:
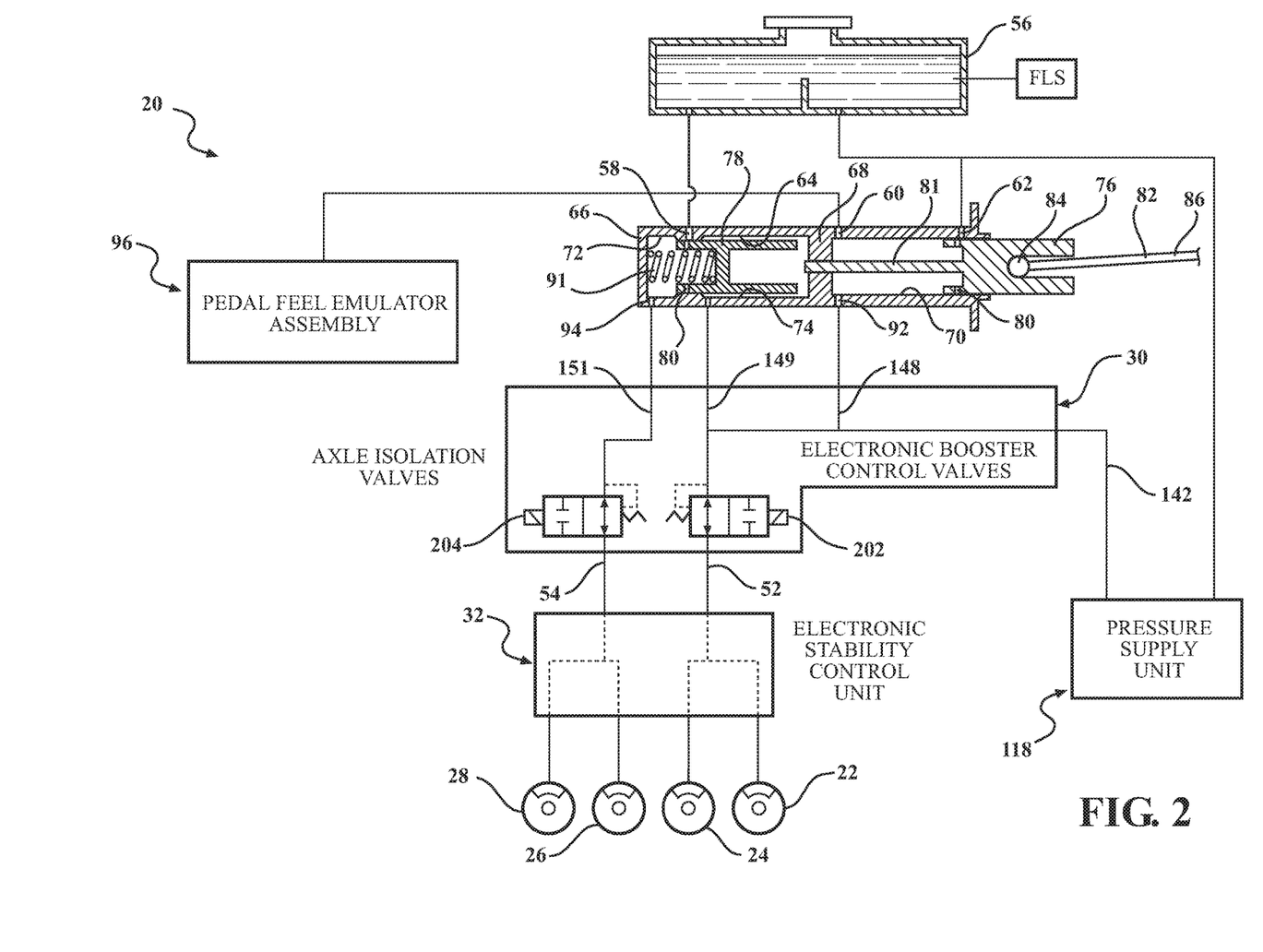
FIG. 2 is a general schematic view of the electro-hydraulic brake system in accordance with one embodiment of the present invention.

A reservoir tank 56 connects to the top surface 34 of the master cylinder block 30 for containing and supplying a brake fluid to the electro-hydraulic brake system 20. As best illustrated in FIG. 2, the top surface 34 of the master cylinder block 30 defines a plurality of holes 58, 60, 62 including a first hole 58, a second hole 60, and a third hole 62, each having a generally circular shape and spaced from one another. The first hole 60 and the third hole 62 are in fluid communication with the reservoir tank 56 to allow fluid transfer between the reservoir tank 56 and the master cylinder block 30. One of the side surfaces 38 defines a bore 64, having a generally cylindrical shape, disposed adjacent to the top surface 34 and in fluid communication with the first hole 58 and the third hole 62. The bore 64 extends along the master cylinder block 30 parallel to the top and bottom surfaces 34, 36 and terminating at a distal end 66 spaced from another one of the side surfaces 38. A projection 68 is located in the bore 64 dividing the bore 64 into a primary chamber 70 and a secondary chamber 72, 74. The secondary chamber 72, 74, in fluid communication with the first hole 58, extends between the distal end 66 and the projection 68. The primary chamber 70, in fluid communication with the second hole 60 and the third hole 62, extends between the one of the side surfaces 38 and the projection 68.

Figure 3A:
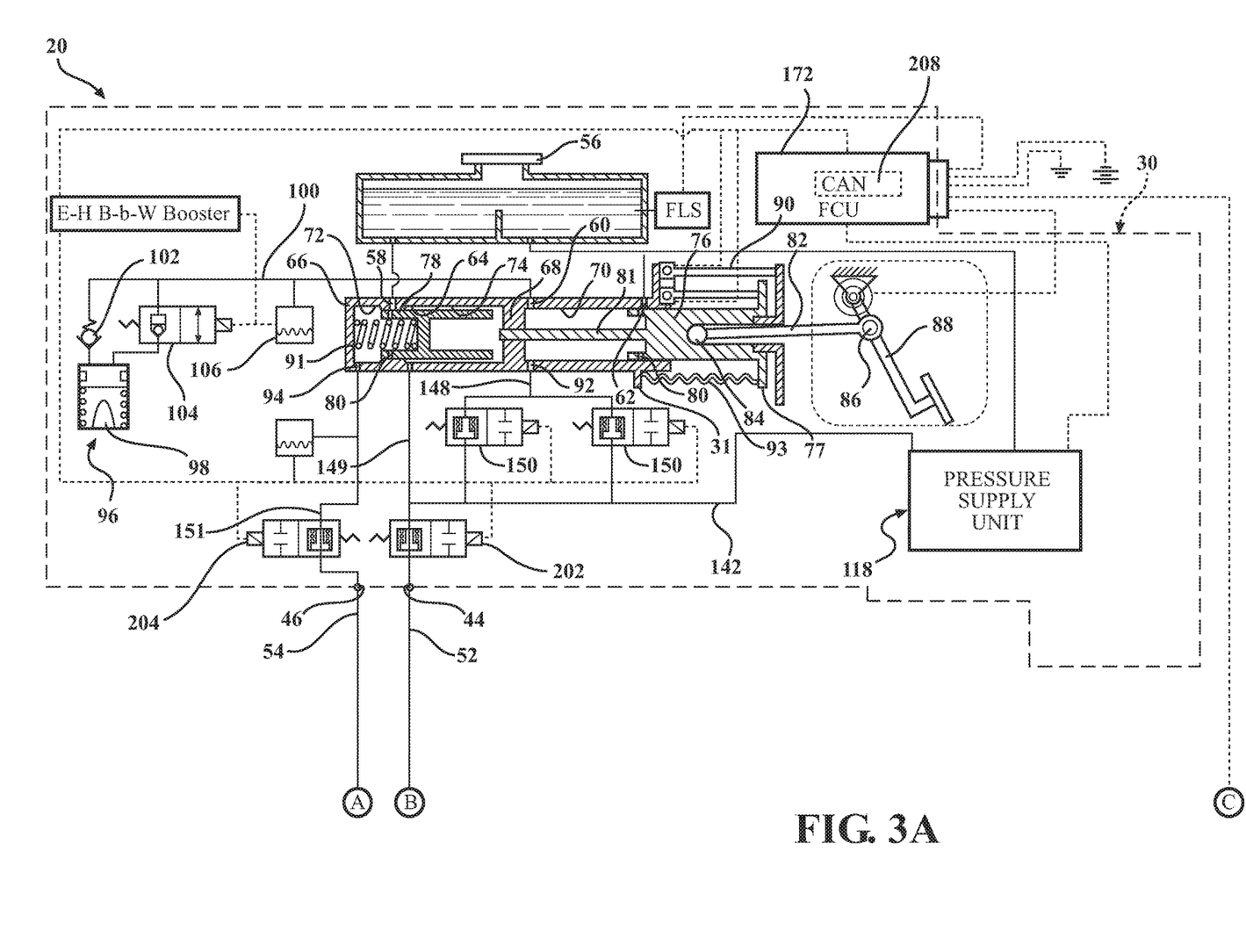
FIG. 3A is a detailed schematic view of a master cylinder block of the electro-hydraulic brake system.
Figure 3B:
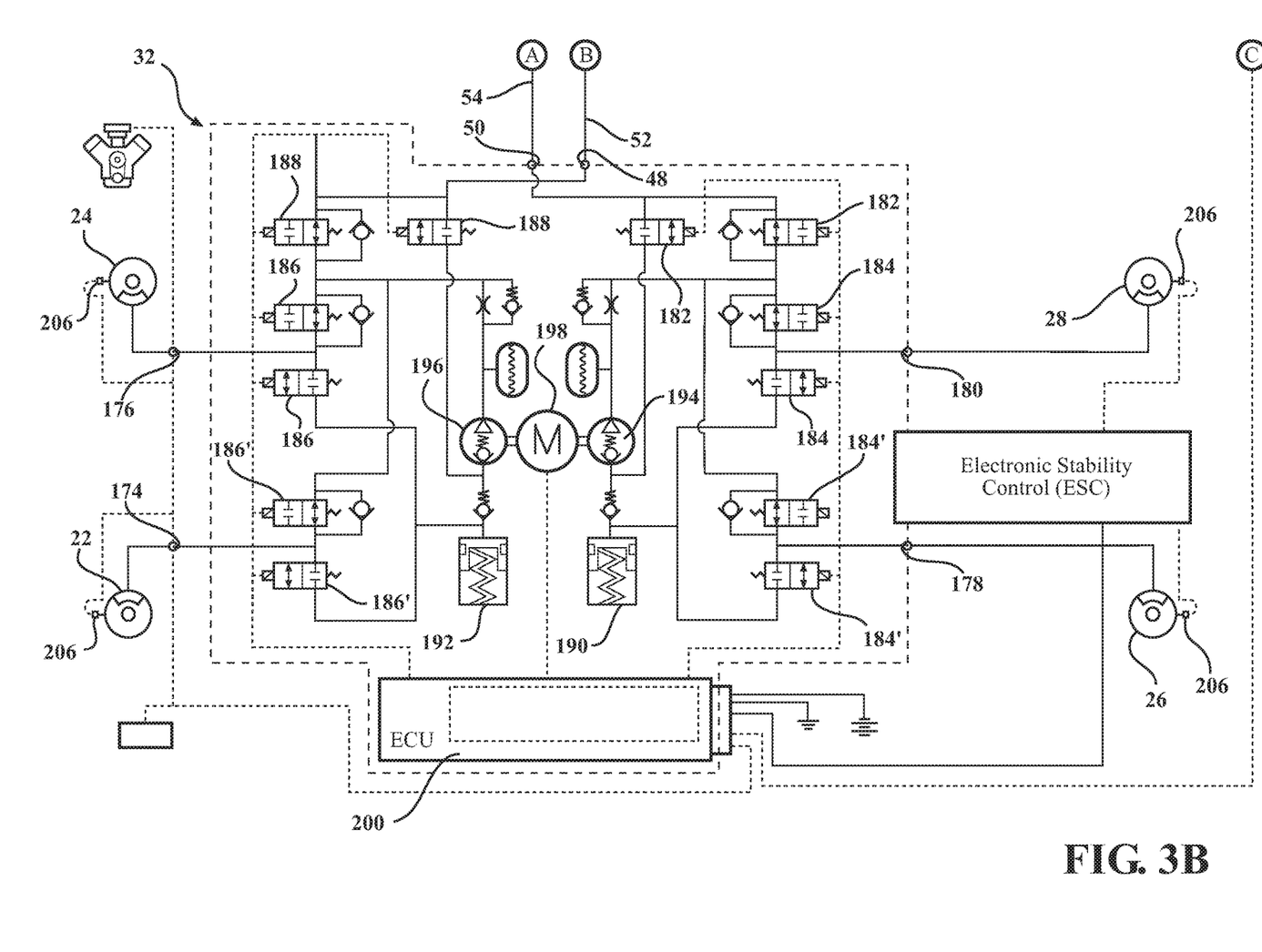
FIG. 3B is a detailed schematic view of a manifold block of the electro-hydraulic brake system.

As best illustrated in FIGS. 2, 3A and 3B, the master cylinder block 30 has at least one brake piston 76, 78 slidably disposed in the bore 64. The at least one brake piston 76, 78 includes a primary piston 76 and a secondary piston 78 disposed in a tandem relationship with one another. The secondary piston 78, having a generally H-shaped cross-section, located in the secondary chamber 72, 74 and adjacent to the distal end 66 dividing the secondary chamber into a first compartment 72 and a second compartment 74. The first compartment 72 extends between the distal end 66 and the secondary piston 78. The second compartment 74 extends between the secondary piston 78 and the projection 68. The primary piston 76, having a generally H-shaped cross-section, located in the primary chamber 70 adjacent to the secondary piston 78. Each of the pistons 76, 78 defines at least one aperture 80 for regulating the flow of the brake fluid from the reservoir tank 56 to the bore 64. The primary piston 76 includes a shaft 81 extending outwardly from the primary piston 76, along the bore 64 and through the projection 68, and into the second compartment 74 for engagement with the secondary piston 78. In another arrangement, instead of the two pistons 76, 78 being disposed in a tandem relationship with one another, the present invention can include one piston disposed in the bore 64 for regulating the flow of the brake fluid.

A push rod 82, slidably disposed in the bore 64, extends between a first end 84 and a second end 86 for moving the at least one piston 76, 78 in the bore 64. The first end 84 is coupled to the primary piston 76. The second end 86 is coupled to a brake pedal 88 for allowing a user to move the pistons 76, 78, via the brake pedal 88, between an opened position and a closed position. The opened position is defined as the at least one aperture 80 being in communication or alignment with the first hole 58 and the third hole 62 for allowing the brake fluid to flow from the reservoir tank 56, through the at least one aperture 80, to the bore 64. The closed position is defined as the pistons 76, 78 covering the first hole 58 and the third hole 62 to prevent the brake fluid from flowing from the reservoir tank 56 to the bore 64 and apply a brake fluid pressure to the electro-hydraulic brake system 20. At least one travel sensor 90 connects to the pedal 88 for determining the amount of travel applied to the pedal 88 by the user.

At least one elastic member 91, 93 is disposed in the first compartment 72 of the bore 64 for returning the secondary piston 78 from the closed position to the opened position. The at least one elastic member 91, 93 includes a first elastic member located between the distal end 66 and the secondary piston 78. It should be appreciated that the at least one elastic member 91 can include a second elastic member 93, located between a positive stop feature 31 on the master cylinder block 30 and a positive stop feature 77 on the primary piston 76. The master cylinder block 30 further defines a primary orifice 92 and a secondary orifice 94 for supplying brake fluid to the manifold block 32 in the closed position. The primary orifice 92 is located in the primary chamber 70 adjacent to and spaced from the projection 68. The secondary orifice 94 is located adjacent to and spaced from the distal end 66.

A pedal feel emulator 96 disposed in fluid connection with the second hole 60 and the primary chamber 70 for providing a resistance force to the primary piston 76 in response to a user pushing the pedal 88 to provide the resistance force to the user. The pedal feel emulator 96 includes a pedal feel accumulator 98 for providing a prescribed resistance to the pressure from the driver's foot, a pedal feel line 100, a pedal feel check valve 102, and a pedal feel valve 104. The pedal feel line 100 extends between the pedal feel accumulator 98 and the hole 60 connecting the pedal feel accumulator 98 with the primary chamber 70 for supplying the brake fluid to the primary chamber 70 to establish the resistance force. The pedal feel check valve 102 is located in the pedal feel line 100 between the pedal feel accumulator 98 and the primary chamber 70 for allowing the brake fluid to flow from the pedal feel accumulator 98 to the primary chamber 70 while preventing backflow of the brake fluid flow into the pedal feel accumulator 98. The pedal feel valve 104 is located in the pedal feel line 100 between the pedal feel accumulator 98 and the primary chamber 70, in a parallel relationship with the pedal feel check valve 102, allowing the brake fluid flow from the primary chamber 70 to the pedal feel accumulator 98 as well as brake fluid to flow from the pedal feel accumulator 98 to the primary chamber 70 even if the pedal feel valve 104 is closed. The pedal feel emulator 96 can further include a pressure sensor 106 located between the pedal feel check valve 102, the pedal feel valve 104, and the primary chamber 70 for monitoring brake fluid pressure in the pedal feel line 100.

Figure 4:
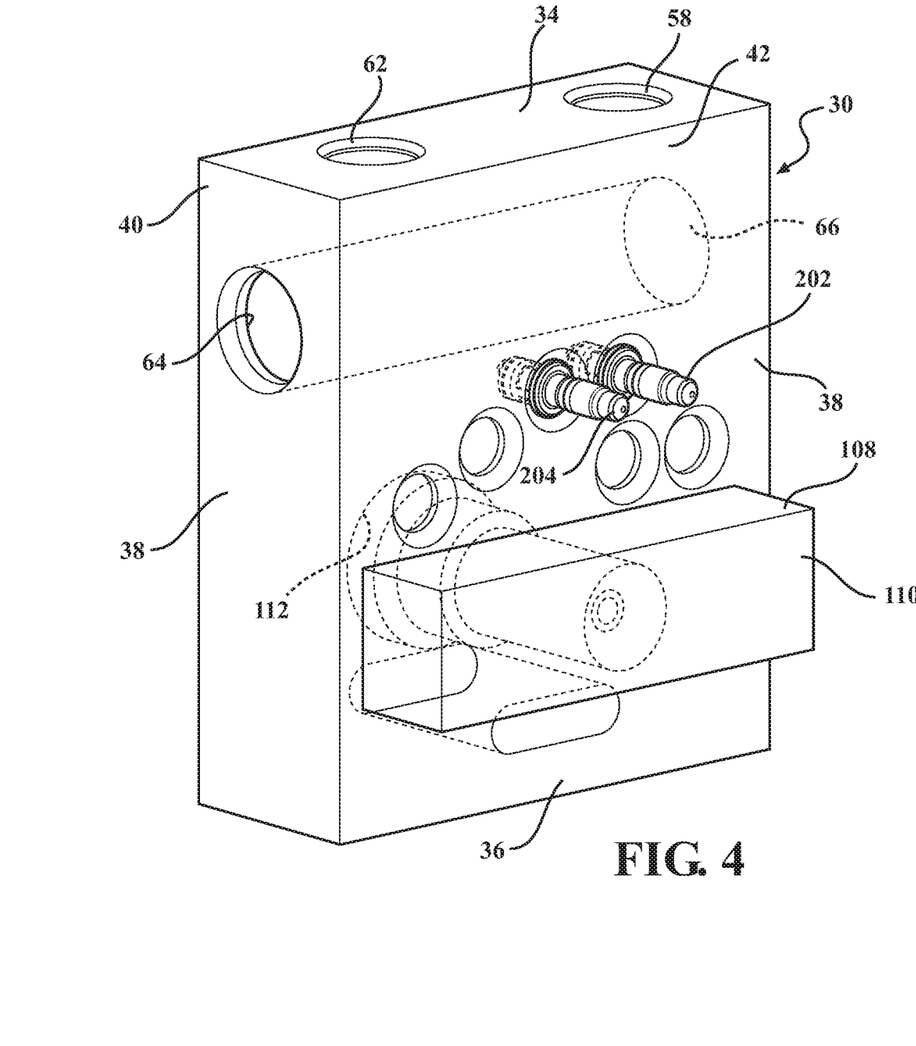
FIG. 4 is a perspective view of a master cylinder block of the electro-hydraulic brake system.
Figure 5:
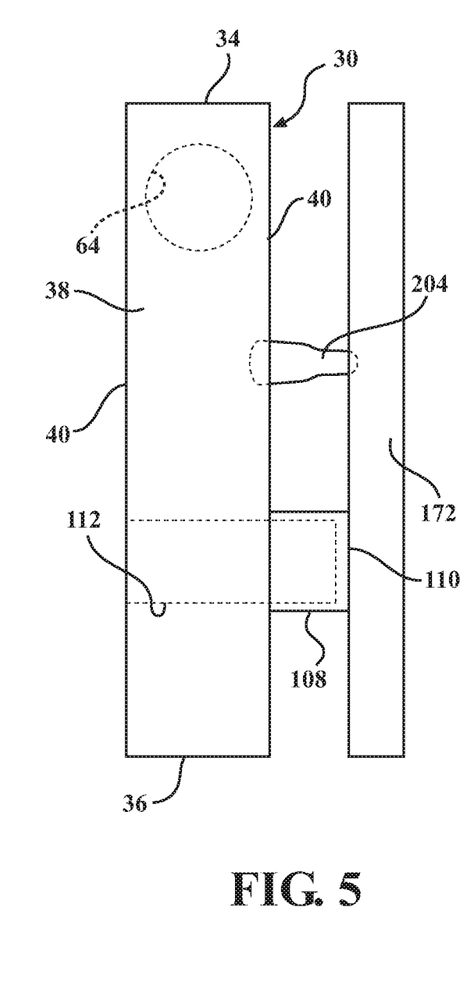
FIG. 5 is a side view of the master cylinder block including a master cylinder electronic control unit.

Referring to FIGS. 4 and 5, the master cylinder block 30 has a protrusion 108 located on the rear surface 42 of the master cylinder block 30, adjacent and spaced apart from the bottom surface 36, extending perpendicularly outwardly from the rear surface 42 to a terminal end 110. The front surface 40 of the master cylinder block 30 defines a channel 112, having a generally cylindrical shape, adjacent to the bottom surface 36 and extending along a center axis A through the front surface 40 and the rear surface 42 into the protrusion 108 terminating prior to the terminal end 110 of the protrusion 108. The master cylinder block 30 defines a first perforation and a second perforation in fluid communication with the channel 112. The first perforation is located adjacent to the terminal end 110 of the protrusion 108 and is in fluid communication with the primary opening 44. The second perforation is located between the front surface 40 and the rear surface 42 and connects to the reservoir tank 56.

A pressure supply unit 118 attaches to the front surface 40 of the master cylinder block 30, perpendicular to the front surface 40, covering the channel 112 and in fluid communication with the reservoir tank 56 for supplying the brake fluid from the reservoir tank 56 to the manifold block 32 for providing braking and deceleration to the vehicle. The master cylinder block 30 has a displacement piston line 142 connecting the pressure supply unit 118 to the primary opening 44. In addition, the displacement piston line 142 connects to the primary opening 44 and the primary fluid connection line 52 to facilitate with the transfer of the brake fluid to the manifold block 32. The pressure supply unit 118 can include a displacement piston check valve located in the displacement piston line 142 to prevent backflow of the brake fluid to the reservoir tank 56. The pressure supply unit 118 can also include a pressure supply isolation valve located in the displacement piston line 142 for regulation of brake fluid flow to and from the pressure supply unit 118 to the primary opening 44. It should be appreciated that pressure supply isolation valve can be a normally closed type valve for closing the fluid flow from the pressure supply unit 118 in response to a failure of the pressure supply unit 118. This arrangement of the pressure supply isolation valve allows the master cylinder block 30 to immediately switch from using the pressure supply unit 118 to the pistons 76, 78 in response to a failure of the pressure supply unit 118.

A first fluid transfer line 148 connects the primary chamber 70 and the primary orifice 92 to the displacement piston line 142 and the primary opening 44 for supplying the brake fluid from the primary chamber 70 to the primary opening 44. A second fluid transfer line 149 connects the second compartment 74 to the displacement piston line 142 and the primary opening 44. At least one flow valve 150 located in the first fluid transfer line 148 for controlling brake fluid flow from the primary chamber 70 to the primary opening 44. It should be appreciated that brake fluid flow in displacement piston line 142 will be propagated to the primary opening 44 as well as being propagated to the second compartment 74, and that the resulting pressure from brake fluid flow will be transferred by the secondary piston 78 to the first compartment 72. According to an embodiment of the present invention, the at least one flow valve 150 includes a pair of flow valves 150 located in the first fluid transfer line 148, in a parallel relationship to one another, for controlling brake fluid flow from the primary chamber 70 to the primary orifice 92. It should also be appreciated that the flow valves 150 can be normally open valves for regulating fluid flow from the bore 64 to the primary opening 44. A third fluid transfer line 151 connects the secondary orifice 94 of the first compartment 72 to the secondary opening 46.

According to an embodiment of the present invention, the pressure supply unit 118 can include an actuator for moving a displacement piston between an extended position and a retracted position. In the extended position, the actuator moves the displacement piston from the retracted position axially along the center axis to supply the brake fluid to the primary opening. In the retracted position, the displacement piston is in fluid communication with the reservoir tank 56 for supplying the brake fluid to the pressure supply unit 118. One such a pressure supply unit is disclosed in U.S. Pat. No. 9,205,821 which is hereby incorporated by reference.

Referring back to FIG. 1, the master cylinder block 30 has a master cylinder electronic control unit 172 coupled to the rear surface 42 of the master cylinder block 30 and in an abutment relationship with the protrusion 108 allowing the master cylinder block 30 to also serve as a heat sink or ground for the master cylinder electronic control unit 172. The master cylinder electronic control unit 172 is in communication with the pressure supply isolation valve 146, the pressure supply unit 118, the pressure sensor 106, and the travel sensor 90 to selectively control the boost valve 146 and the pressure supply unit 118 and regulate the fluid pressure from the master cylinder block 30 to the manifold block 32 based on a feedback received from the travel sensor 90 and the pressure sensor 106.

Referring back to FIGS. 3A and 3B, the manifold block 32, also known as a stability control unit 32, connects to the master cylinder block 30 to receive the brake fluid from the master cylinder block 32 and supplies the brake fluid to the wheel brakes 22, 24, 26, 28 of the vehicle.

The manifold block 32 defines a plurality of outlets 174, 176, 178, 180 for fluid connection with the wheel brakes 22, 24, 26, 28 to supply the brake fluid to the wheel brakes 22, 24, 26, 28. The outlets 174, 176, 178, 180 include a first outlet 174, a second outlet 176, a third outlet 178, and a fourth outlet 180, spaced from one another. The first outlet 174 is in fluid communication with a left front wheel brake 22. The second outlet 176 is in fluid communication with a right front wheel brake 24. The third outlet 178 is in fluid communication with a left rear wheel brake 26. The fourth outlet 180 is in fluid communication with a right rear wheel brake 28. The primary inlet 48 is in communication with the first outlet 174 and the second outlet 176 for transferring the brake fluid to the left front wheel brake 22 and the right front wheel brake 24. The secondary inlet 50 is in communication with the third outlet 178 and the fourth outlet 180 for transferring the brake fluid to the left rear wheel brake 26 and the right rear wheel brake 28.

A plurality of stability valves 182, 184, 184', 186, 186', 188 are located between the inlets 48, 50 and the outlets 182, 184, 184', 186, 186', 188 for controlling the flow of the brake fluid and varying the brake fluid pressure at the wheel brakes 22, 24, 26, 28 to provide ride stability to the user. The plurality of stability valves 182, 184, 186, 188 includes a first set of stability valves 182, a second set of stability valves 184, a third set of stability valves 186, and a fourth set of stability valves 188. The first set of stability valves 182 are located between the secondary inlet 50 and stability valves 184 and 184' to regulate pump 194 pressure to the rear brake circuit outlets 178 and 180 if required. The second set of stability valves 184 are located between the second outlet 180 and the secondary inlet 50 for controlling the flow of the brake fluid from the secondary inlet 50 to the right rear wheel brake 28. The third set of stability valves 184' are located between the second outlet 178 and the secondary inlet 50 for controlling the flow of the brake fluid from the secondary inlet 50 to the left rear wheel brake 26. The fourth set of stability valves 188 are located between the primary inlet 48 and stability valves 186 and 186' to regulate pump 196 pressure to the front brake circuit outlets 174 and 176 if required. The fifth set of stability valves 186 are located between the third outlet 176 and the primary inlet 48 for controlling the flow of the brake fluid from the primary inlet 48 to the right front wheel brake 24. The sixth set of stability valves 186' are located between the fourth outlet 174 and the primary inlet 48 for controlling the flow of the brake fluid from the primary inlet 48 to the left front wheel brake 22.

The manifold block 32 further includes at least one manifold accumulator 190, 192 disposed in fluid communication with the stability valves 182, 184, 184', 186, 186', 188. In one arrangement, the at least one manifold accumulator 190, 192 includes a first manifold accumulator 190 and a second manifold accumulator 192. The first manifold accumulator 190 is in fluid communication with the first, second, and third set of stability valves 182, 184, 184'. The second manifold accumulator 192 is in fluid communication with the fourth, fifth and sixth set of stability valves 186, 186', 188. A rear wheel brake pump 194 is disposed between the first and the second and the third sets of stability valves 182, 184, 184' and the first manifold accumulator 190 for supplying a fluid pressure to the rear wheel brakes 26, 28. A front wheel brake pump 196 is disposed between the fourth, the fifth, and the sixth sets of stability valves 186, 186', 188 and the second manifold accumulator 192 for supplying a fluid pressure to the front wheel brakes 22, 24. A motor 198 connects to the front wheel brake pump 196 and the rear wheel brake pump 194 for driving the front wheel brake pump 196 and the rear wheel brake pump 194 to provide the fluid pressure to the front wheel brake 22, 24 and the rear wheel brake 26, 28. It should be appreciated that each of the wheel brakes 22, 24, 26, 28, in addition to the wheel speed sensor 206, can include at least one wheel brake sensor (not shown) for monitoring the brake fluid pressure.

A manifold block electronic control unit 200 attaches to the manifold block 32 for controlling the manifold block 32 brake fluid flow and pressure. The manifold block electronic control unit 200 is in electronic communication with the wheel speed sensors 206, the stability valves 182, 184, 184', 186, 186', 188, and the motor 198. Based on the feedback received from the wheel speed sensors 206, the manifold block electronic control unit 200 can selectively open/close the stability valves 182, 184, 184', 186, 186', 188 and vary the speed of the motor 198 to adjust the fluid pressure within the manifold block 32 to provide stability to the vehicle. It should be appreciated that the manifold block electronic control unit 200 can also be in electronic communication with the master cylinder electronic control unit 172 to receive feedback from the master cylinder block 30 and control the stability of the vehicle.

As illustrated in FIGS. 4-8, at least one isolation valve 202, 204, located in the second fluid transfer line 149 or the third fluid transfer line 151, is disposed on the rear surface 42 of the master cylinder block 30 spaced apart from the protrusion 108 for allowing brake fluid flow control from the master cylinder block 30 to the manifold block 32 in the event of a manifold block failure. The at least one isolation valve 202, 204 is received by the master cylinder electronic control unit 172 and electrically connects to the master cylinder electronic control unit 172. Disposing the at least one isolation valve 202, 204 on the rear surface 42 of the master cylinder block 30, spaced apart from the protrusion 108, allows the master cylinder block 30 to have a more simple and compact design for accommodating the at least one isolation valve 202, 204. Additionally, the isolation valves 202, 204 are packed in the master cylinder block 30 and are in direct communication with the master cylinder electronic control unit 172 to exclude any external wiring.

Figure 6:
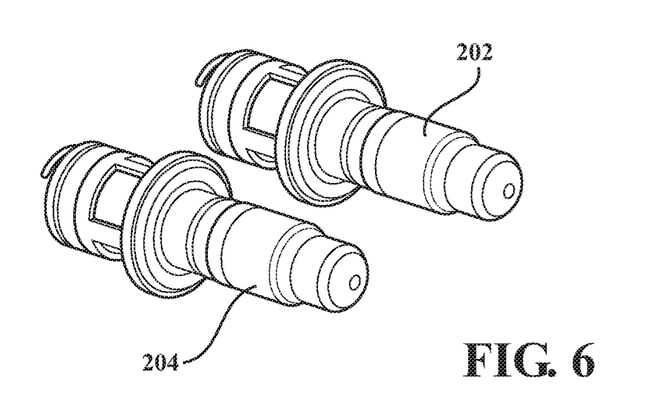
FIG. 6 is a perspective view of a pair of isolation valves used in the electro-hydraulic brake system.
Figure 7:
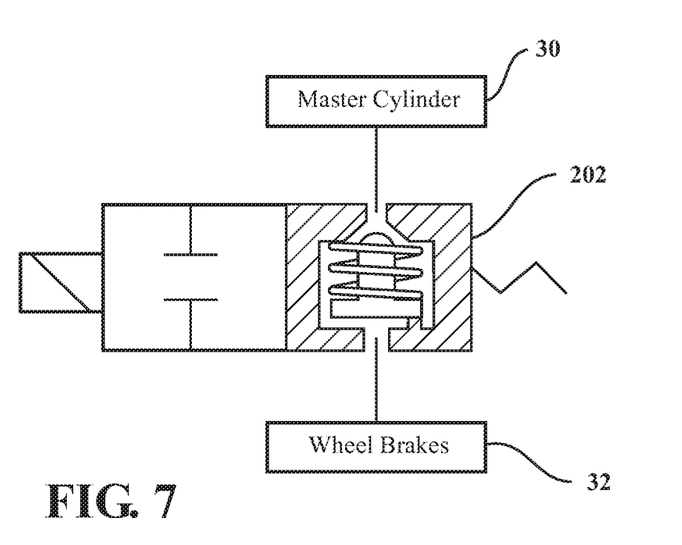
FIG. 7 is an enlarged schematic view of an isolation valve.

According to one arrangement, the at least one isolation valve 202, 204 comprises a pair of isolation valves 202, 204 including a first isolation valve 202 and a second isolation valve 204. The first isolation valve 202 is located in the displacement piston line 142 between the primary chamber 70, the second compartment 74, and the primary opening 44 for controlling brake fluid flow from the primary chamber 70 or the displacement piston line 142 to the primary opening 44. The second isolation valve 204 is located in the third fluid transfer line 151, between the first compartment 72 and the secondary opening 46 for controlling brake fluid flow from the first compartment 72 to the secondary opening 46. Preferably, the isolation valves 202, 204 are normally open valves allowing fluid flow from the master cylinder block 30 to the manifold block 32 in the event of a master cylinder electronic control unit 172 failure. In other words, the isolation valves 202, 204 will remain open in the event of a master cylinder electronic control unit 172 failure. As best illustrated in FIGS. 6 and 7, the isolation valves 202, 204 are poppet-style valves designed to prevent the isolation valves 202, 204 from self-closing due to the Bernoulli effect of large flow velocities affecting the internal force balance of the isolation valves 202, 204.

Figure 8:
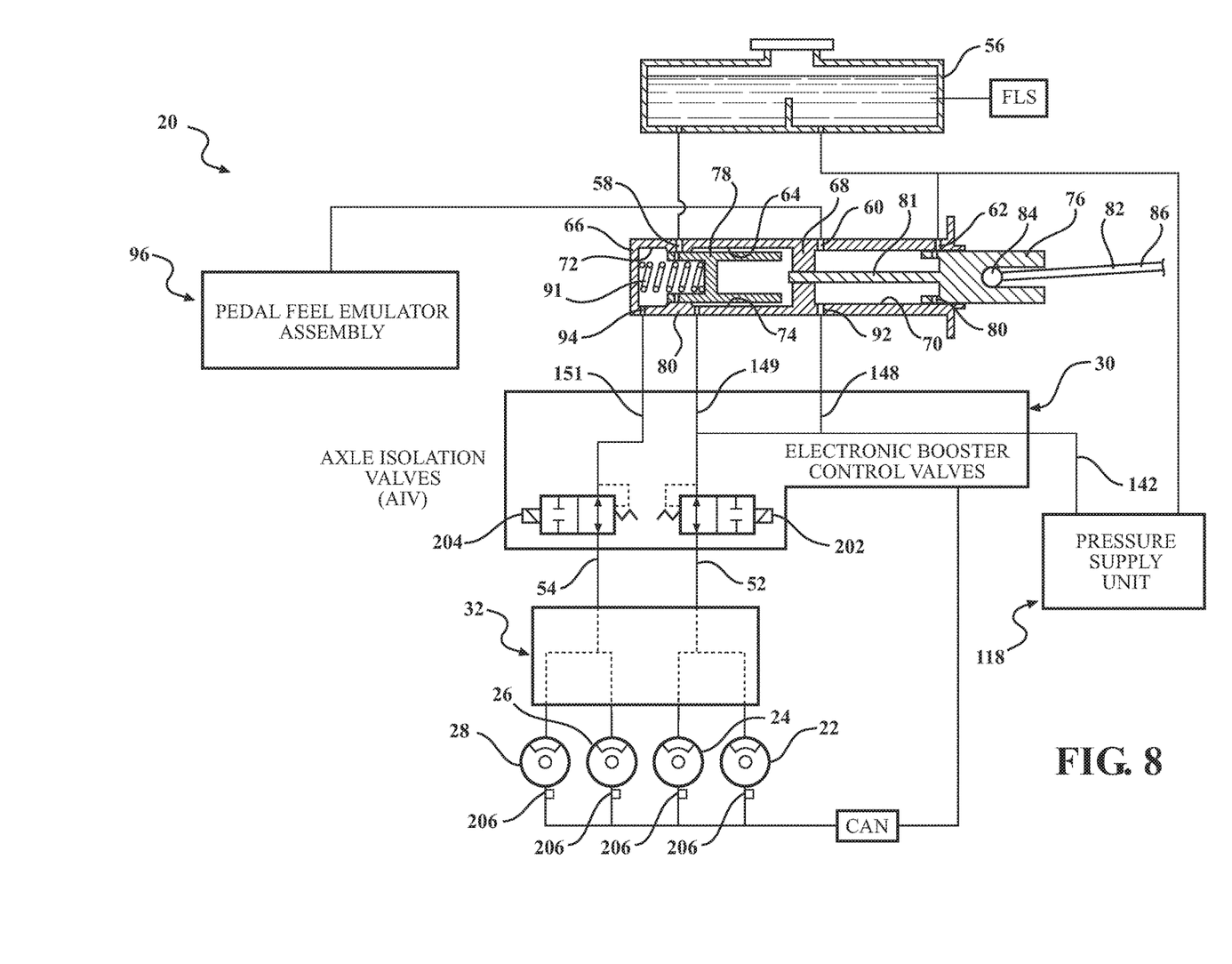
FIG. 8 is a schematic view of a control system for the electro-hydraulic brake system in response to a manifold block failure.

According to one arrangement, both the master cylinder electronic control unit 172 and the manifold electronic control unit 200 are connected to the isolation valves 202, 204 to selectively activate/deactivate the isolation valves 202, 204 for controlling brake fluid flow from the master cylinder block 30 to the manifold block 32. It should be appreciated that the master cylinder electronic control unit 172 can be electrically connected to the manifold electronic control unit 200 to receive feedback and specific information received by the manifold electronic control unit 200. As best shown in FIG. 8, the electro-hydraulic brake system includes a wheel speed sensor 206 attached to each one of the wheel brakes 22, 24, 26, 28 for measuring the wheel speeds. Preferably, the wheel speed sensors 206 are electrically connected to both the master cylinder electronic control unit 172 and the manifold electronic control unit 200. In operation, the wheel speed sensors 206 measure the wheel speed at each wheel and the output is processed by the master cylinder electronic control unit 172 and the manifold electronic control unit 200 for controlling the wheel slip at each wheel. Signals from the wheel speed sensors 206 are typically transmitted by a Controller Area Network 208 (or CAN bus 208) that is in electrical communication with the master cylinder electronic control unit 172.

Figure 9:
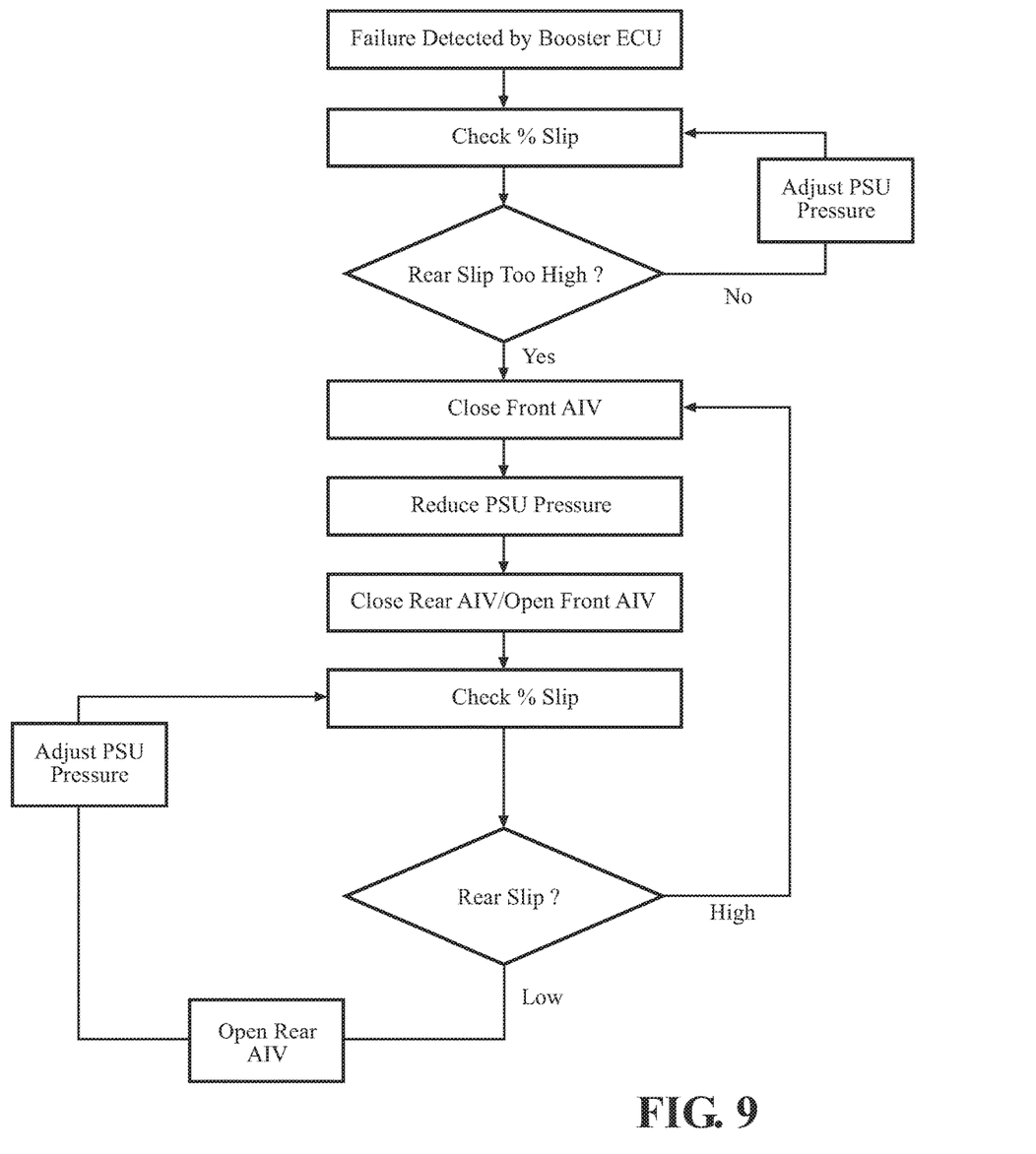
FIG. 9 is a schematic view of a flow chart for controlling the isolation valves in response to the manifold block failure.

FIG. 9 provides a schematic flow chart for a method of controlling the isolation valves 202, 204 using the master cylinder electronic control unit 172 in response to a manifold block failure. It should be noted here that only the manifold block 32 is capable of controlling individual pressures of wheel brake 22, 24, 26, and 28. The isolation valves 202, 204 will be capable of providing axle to axle pressure control in that the isolation valve 202 will govern equal pressures to wheel brakes 22 and 24, and the isolation valve 204 will govern equal pressures to wheel brake 26 and 28. While not as good as individual wheel brake control, the isolation valves 202 and 204, sometimes referred to as axle isolation valves, will provide the optimal overall front to rear brake balance to maintain vehicle stability. In operation, the method begins with a step of detecting a manifold block failure. Because the master cylinder electronic control unit 172 is in electrical communication with the manifold electronic control unit 200, the manifold block failure can be detected in several ways. For example, the manifold block failure can be determined when the master cylinder electronic control unit 172 no long receives signals or information from the manifold electronic control unit 200, e.g. due to a loss of power. Alternatively, the manifold block failure can be determined when the master cylinder electronic control unit 172 receives signal(s) from the manifold electronic control unit 200 that the stability valves 182, 184, 184', 186, 186', 188, the first manifold accumulator 190, the second manifold accumulator 192, or the motor 198 have malfunctioned.

Upon detecting the manifold block failure, the method proceeds with a step of determining percent slip for the wheels based on feedback received from the wheel speed sensors 206. Referring back to FIG. 8, the master cylinder electronic control unit 172 is shown receiving, via the CAN 208, vehicle status information. This information can include information from one or more of the following:

vehicle motion sensors including longitudinal and lateral acceleration, wheel speed sensors 206, steering sensors. This information can be used to determine wheel speed changes and vehicle motions including body lateral slippage. The wheel speed changes and vehicle motions are compared to stability operational boundaries in the master cylinder electronic control unit 172 to determine whether one or more wheels are slipping and/or skidding laterally, or about to slip and/or skid laterally and/or whether the vehicle is progressing into a region of unstable motion, and whether the actual or anticipated wheel slip and/or lateral skid needs to be reduced. To reduce the percent slip, the method proceeds with a step of selectively opening and closing the isolation valves or reducing brake fluid pressure supplied by the pressure supply unit 118.

Referring to FIG. 9, according to one embodiment of the present invention, to determine percent slip, the feedback received from rear wheel speed sensors of the wheel speed sensors 206 is referenced or compared against a predetermined threshold. In response to the percent slip being greater than the predetermined threshold, the method proceeds with a step of reducing brake fluid pressure supplied by the pressure supply unit 118 to the rear wheel brakes 26, 28. In response to the percent slip being greater than the predetermined threshold, the method proceeds with the steps of:
a) closing the first isolation valve 202;
b) reducing brake fluid pressure supplied by the pressure supply unit 118;
c) closing the second isolation valve 204 and opening the first isolation valve 202;
d) re-adjusting pressure supply unit 188 brake fluid pressure; and
e) determining the percent slip based on the feedback received from the rear wheel speed sensors.

After performing the above mentioned steps, the percent slip received from step e) above is further compared against the predetermined threshold. In response to the percent slip of step e) being less than the predetermined threshold, the method proceeds with a step of adjusting brake fluid pressure supplied by the pressure supply unit 118 to the driver's requested deceleration. In response to the percent slip of step e) being greater than the predetermined threshold, steps a)-d) are repeated until the percent slip is less than the predetermined threshold.

This arrangement of the isolation valves 202, 204 also provides hill hold fallback function. In other words, the arrangement of the isolation valves 202, 204 allows the electro-hydraulic brake system 20 to maintain a wheel pressure for a longer period of time in response to a failure of the manifold block 32 or without energizing the manifold block 32 thereby reducing energy consumption of the electro-hydraulic brake system 20. Further, the arrangement of the isolation valves 202, 204 allows for internal pressure testing of the electro-hydraulic brake system 20 without affecting the wheel pressure. By closing the axle isolation valves 202, 204 and pressurizing the manifold block 32, internal pressure sensors (not shown) of the electro-hydraulic brake system 20 can check the internal pressure of the electro-hydraulic brake system 20. Furthermore, by adding additional hardware (not shown) it is possible to check the functions of the pedal feel emulator isolation valve 146 by monitoring the displacement of the displacement piston 128 using the actuator angular position sensor 163 readout.

Obviously, many modifications and variations of the present invention are possible in light of the above teachings and may be practiced otherwise than as specifically described while within the scope of the appended claims.

These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An electro-hydraulic brake system for a vehicle having a plurality of wheel brakes, the electro-hydraulic brake system comprising:
   a master cylinder block disposed in fluid communication with a reservoir tank containing a brake fluid;
   said master cylinder block defining a bore extending along a side surface of said master cylinder block for receiving at least one brake piston and a pair of openings including a primary opening and a secondary opening, spaced apart from one another, in fluid communication with said bore;
   a protrusion extending outwardly from a rear surface of said master cylinder block to a terminal end;
   a pressure supply unit coupled to a front surface of said master cylinder block and in fluid communication with said reservoir tank for supplying the brake fluid from said reservoir tank;
   a master cylinder electronic control unit coupled to said rear surface of said master cylinder block and in an abutment relationship with said protrusion; and
   at least one isolation valve disposed on said rear surface, spaced apart from said protrusion and received by said master cylinder electronic control unit, for regulating brake fluid flow from said master cylinder block to the wheel brakes,
   wherein the electro-hydraulic brake system further includes a manifold block disposed in fluid communication with said master cylinder block for supplying the brake fluid from said master cylinder block to the wheel brakes; and
   a wheel speed sensor coupled to each of the wheel brakes and configured to measure wheel speed and communicating the wheel speed to said master cylinder electronic control unit,
   wherein, in response to a manifold block failure, said master cylinder electronic control unit determines percent slip based on the wheel speed received from said wheel speed sensor and, in response to said percent slip exceeding a predetermine threshold, said master cylinder electronic control unit selectively opens and closes said at least one isolation valve to permit brake fluid pressure supplied by said pressure supply unit to be reduced said percent slip below said predetermined threshold.

2. The electro-hydraulic brake system as set forth in claim 1 wherein said at least one isolation valve includes a pair of isolation valves having a first isolation valve and a second isolation valve spaced apart from one another.

3. The electro-hydraulic brake system as set forth in claim 2 wherein said first isolation valve is located between said bore and said primary opening for controlling brake fluid flow between said bore and said primary opening; and
   said second isolation valve is located between said bore and said secondary opening for controlling brake fluid flow between said bore and said secondary opening.

4. The electro-hydraulic brake system as set forth in claim 2 wherein said first isolation valve and said second isolation valve are normally open valves.

5. The electro-hydraulic brake system as set forth in claim 2 wherein said first isolation valve and said second isolation valve are poppet-style valves.

6. An electro-hydraulic brake system for a vehicle having a plurality of wheel brakes, the electro-hydraulic brake system comprising:
- a master cylinder block disposed in fluid communication with a reservoir tank containing a brake fluid;
- a manifold block disposed in fluid communication with said master cylinder block for supplying the brake fluid from said master cylinder block to the wheel brakes;
- said master cylinder block defining a bore extending along a side surface of said master cylinder block for receiving at least one brake piston and a pair of openings including a primary opening and a secondary opening, spaced apart from one another, in fluid communication with said bore;
- a protrusion extending outwardly from a rear surface of said master cylinder block to a terminal end;
- a pressure supply unit coupled to a front surface of said master cylinder block and in fluid communication with said reservoir tank for supplying the brake fluid from said reservoir tank;
- a master cylinder electronic control unit coupled to said rear surface of said master cylinder block and in an abutment relationship with said protrusion; and
- at least one isolation valve disposed on said rear surface, spaced apart from said protrusion and received by said master cylinder electronic control unit, for regulating brake fluid flow from said master cylinder block to the wheel brakes,
- wherein the electro-hydraulic brake system further includes a wheel speed sensor coupled to each of the wheel brakes and configured to measure wheel speed and communicating the wheel speed to said master cylinder electronic control unit,
- wherein, in response to a manifold block failure, said master cylinder electronic control unit determines percent slip based on the wheel speed received from said wheel speed sensor and, in response to said percent slip exceeding a predetermine threshold, said master cylinder electronic control unit selectively opens and closes said at least one isolation valve to permit brake fluid pressure supplied by said pressure supply unit to be reduced to said percent slip below said predetermined threshold.

7. The electro-hydraulic brake system as set forth in claim 6 wherein said at least one isolation valve includes a pair of isolation valves having a first isolation valve and a second isolation valve spaced apart from one another.

8. The electro-hydraulic brake system as set forth in claim 7 wherein said first isolation valve is located between said bore and said primary opening for controlling brake fluid flow between said bore and said primary opening; and
said second isolation valve is located between said bore and said secondary opening for controlling brake fluid flow between said bore and said secondary opening.

9. The electro-hydraulic brake system as set forth in claim 7 wherein said first isolation valve and said second isolation valve are normally open valves.

10. The electro-hydraulic brake system as set forth in claim 7 wherein said first isolation valve and said second isolation valve are poppet-style valves.

11. A method of preventing wheel slip for a vehicle having a plurality of wheel brakes each having a wheel speed sensor using an electro-hydraulic brake system, the electro-hydraulic brake system includes a master cylinder block defining a bore and a pair of openings including a primary opening and a secondary opening in fluid communication with the bore, a manifold block in fluid communication with the master cylinder block, a pressure supply unit coupled the master cylinder block, a pair of isolation valves including a first isolation valve and a second isolation valve with the first isolation valve being located between the bore and the primary opening and the second isolation valve being located between the bore and the secondary opening, and a master cylinder electronic control unit connected to the wheel speed sensors, said method comprising the steps of:
- detecting a failure in the manifold block;
- determining percent slip for the wheels based on feedback received from the wheel speed sensors; and
- reducing the percent slip by selectively opening and closing the isolation valves or reducing brake fluid pressure supplied by the pressure supply unit.

12. The method as set forth in claim 11 wherein said step of determining percent slip is defined as comparing the feedback received from rear wheel speed sensors of the wheel speed sensors against a predetermined threshold.

13. The method as set forth in claim 12 wherein, in response to the percent slip being less than the predetermined threshold, said step of reducing is defined as reducing brake fluid pressure supplied by the pressure supply unit.

14. The method as set forth in claim 12 wherein, in response to the percent slip being greater than the predetermined threshold, said step of reducing including the steps of:
a) closing the first isolation valve;
b) reducing brake fluid pressure supplied by the pressure supply unit;
c) closing the second isolation valve and opening the first isolation valve; and
d) re-adjusting pressure supply unit brake fluid pressure; and
e) determining the percent slip based on the feedback received from the rear wheel speed sensors.

15. The method as set forth in claim 14 wherein, in response to the percent slip of said step e) being less than the predetermined threshold, said step of reducing is defined as reducing brake fluid pressure supplied by the pressure supply unit.

16. The method as set forth in claim 14 wherein, in response to the percent slip of said step e) being greater than the predetermined threshold, said steps a)-d) are repeated until the percent slip is less than the predetermined threshold.

* * * * *